US006501498B2

(12) United States Patent
Takahashi et al.

(10) Patent No.: US 6,501,498 B2
(45) Date of Patent: Dec. 31, 2002

(54) THERMAL PRINTER

(75) Inventors: Akira Takahashi, Nagano-ken (JP); Hiroki Shiozawa, Nagano-ken (JP)

(73) Assignee: Heiwa Tokei Manufacturing Co., Ltd., Iida (JP)

( * ) Notice: Subject to any disclaimer, the term of this patent is extended or adjusted under 35 U.S.C. 154(b) by 158 days.

(21) Appl. No.: 09/765,450

(22) Filed: Jan. 22, 2001

(65) Prior Publication Data

US 2001/0005216 A1 Jun. 28, 2001

Related U.S. Application Data

(62) Division of application No. 09/310,748, filed on May 13, 1999.

(51) Int. Cl.[7] .......................... B41J 17/02; B23Q 15/00

(52) U.S. Cl. .......................................... 347/215; 226/45

(58) Field of Search ............................ 347/215, 2, 222, 347/197, 55; 400/693, 120.13, 120.01, 582; 226/143, 44, 45, 75

(56) References Cited

U.S. PATENT DOCUMENTS

| | | | | |
|---|---|---|---|---|
| 5,062,722 A | * 11/1991 | Shiozaki et al. | ............ | 226/143 |
| 5,248,073 A | * 9/1993 | Tschiderer | ................... | 226/45 |
| 5,447,380 A | * 9/1995 | Colonel et al. | ............. | 346/145 |
| 5,718,527 A | * 2/1998 | Fujimoto et al. | ............. | 226/75 |
| 6,007,263 A | * 12/1999 | Imai et al. | ..................... | 400/55 |
| 6,053,648 A | * 4/2000 | Mistyurik | ................... | 347/197 |
| 6,172,688 B1 | * 1/2001 | Iwasaki et al. | ................ | 347/2 |

* cited by examiner

*Primary Examiner*—Lamson Nguyen
*Assistant Examiner*—K. Feggins
(74) *Attorney, Agent, or Firm*—Dennison, Schultz & Dougherty

(57) ABSTRACT

A thermal printer is disclosed which includes a housing, a chassis assembly with a printer mechanism securely mounted in the housing and a head frame assembly having a thermal head and rotatably mounted on the chassis assembly by a shaft. The shaft is disposed in a paper feeding direction at a side of the chassis assembly. The thermal printer further includes a paper sensor having a sensor frame rotatably mounted on the chassis assembly by a shaft which also is disposed in the paper feeding direction at the side of the chassis assembly.

3 Claims, 10 Drawing Sheets

THERMAL PRINTER

This application is a division of application Ser. No. 09/310,748 filed May 13, 1999.

BACKGROUND OF THE INVENTION

The present invention relates to a thermal printer, and more particularly to a structure of the thermal printer and a structure of a paper detecting sensor.

The thermal printer in which characters are formed by heating selected elements of a dot matrix that is in contact with heat-sensitive paper is widely used in printers such as the facsimile receiver.

U.S. Pat. No. 5,150,130 discloses a label printer and U.S. Pat. No. 5,422,660 discloses a label printer using a transfer ribbon.

In a printer for printing bar codes on label paper, a sensor is provided for detecting the position of the label paper as disclosed in U.S. Pat. No. 4,706,096 and 4,757,329. The paper detecting sensor is mounted on a paper passage. There are two types of the paper detecting sensor. One is the transmitting type sensor and the other is the reflection type sensor. The paper detecting sensor detects the position of the label paper by detecting-a black line or notch formed in a mount or label paper.

There is also used a slide type sensor comprising a pair of members which are opposite set at a position corresponding to the notch of the recording paper.

In the conventional printer using the transfer ribbon, the paper and ribbon must be passed through a narrow gap, and then set at predetermined positions. Consequently, it is difficult to set the paper and ribbon.

On the other hand, a cutter is mounted on the printer, the paper is fed to the cutter and cut by the cutter. Thereafter, the paper is fed back to the printing position. At that time, the ribbon fed back together with the paper is liable to be loosened to cause the ribbon to be wrinkled.

The recording paper is inserted between opposite members of the paper detecting sensor. However, since the members are closely disposed at a small space of 2 or 3 mm, it is troublesome to insert the paper.

Furthermore, if the label peels off and adheres to the paper detecting sensor, the label must be removed. However, it is difficult to remove the label, because the space between opposite members of the sensor is very narrow.

SUMMARY OF THE INVENTION

An object of the present invention is to provide a paper detecting sensor which can be opened.

According to the present invention, there is provided a thermal printer comprising a housing, a chassis assembly provided with a printer mechanism and securely mounted in the housing, a head frame assembly provided with a thermal head and rotatably mounted on the chassis assembly by a shaft which is disposed in a paper feeding direction at a side of the chassis assembly, a paper sensor having a sensor frame rotatably mounted on the chassis assembly by a shaft which is disposed in the paper feeding direction at the side of the chassis assembly.

The thermal printer further comprises closing means for closing the paper sensor together with the head frame assembly, and a pair of ribbon holders rotatably mounted on the head frame assembly, the ribbon holders rotated by power transmitting means from the print mechanism for winding an inked ribbon.

The thermal printer further comprises a ribbon rewinding device for rewinding the inked ribbon about one turn when paper is fed back and heavy load applying means is provided for applying a heavy load to one of the ribbon holders which is to be rotated in a reverse direction when the head frame assembly is opened.

A one-way clutch is provided in the power transmitting means for transmitting driving force to the ribbon holders only when the ribbon holders are rotated in a normal direction.

The closing means comprises a sensor closing plate fixed to head frame assembly so as to contact with the sensor frame when closed.

The ribbon rewinding device comprises a coil spring wound by the power transmitting means when the power transmitting means is rotated in a normal direction.

The heavy load applying means comprises a coil spring provided in the power transmitting means.

The present invention further provides a paper detecting sensor for a printer comprising upper and lower sensor frames pivotally connected to each other by a knobbed shaft, spiral shafts disposed in a paper width direction and rotatably mounted on the upper and lower sensor frames, respectively, a sensor holder having a sensor and slidably engaged with each of the spiral shafts, a first screw gear securely mounted on the knobbed shaft, second and third screw gears each of which is secured to each of the spiral shafts and engaged with the first screw gear, whereby when the knobbed shaft is rotated each of the sensor holders is moved in the paper width direction.

These and other objects and features of the present invention will become more apparent from the following detailed description with reference to the accompanying drawings.

DETAILED DESCRIPTION OF THE PREFERRED EMBODIMENT

Figure 1:
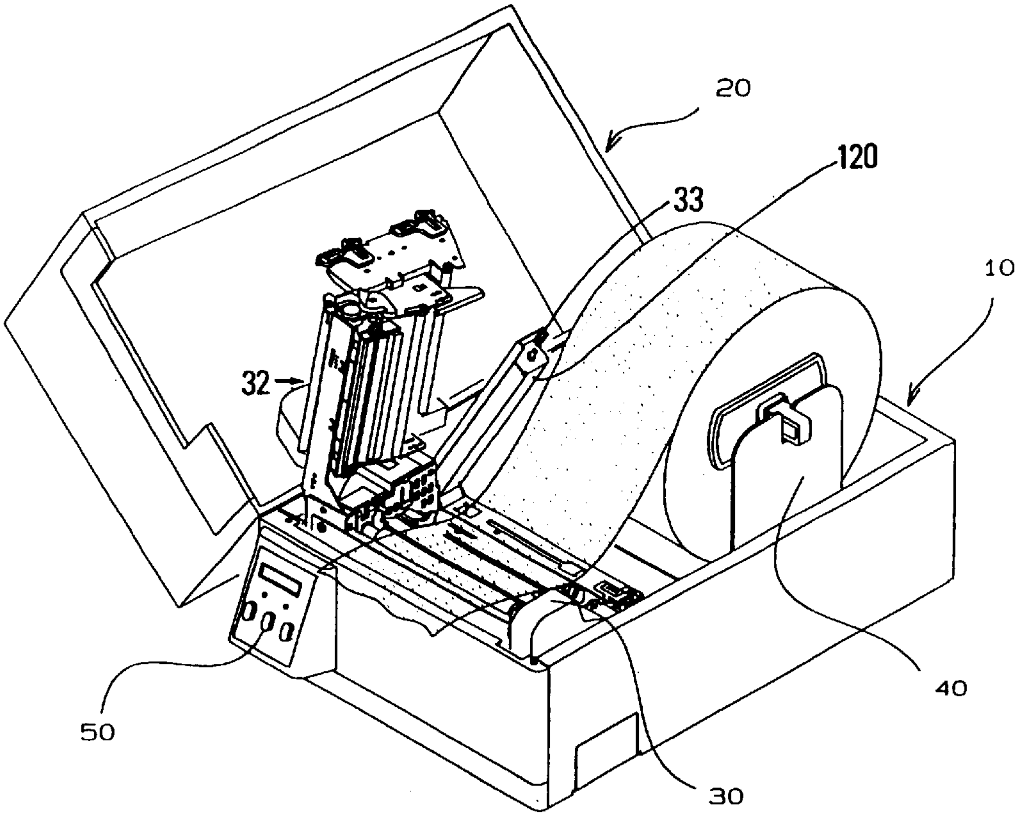
FIG. 1 is a perspective view of a thermal printer according to the present invention when a print mechanism is opened.
Figure 2:
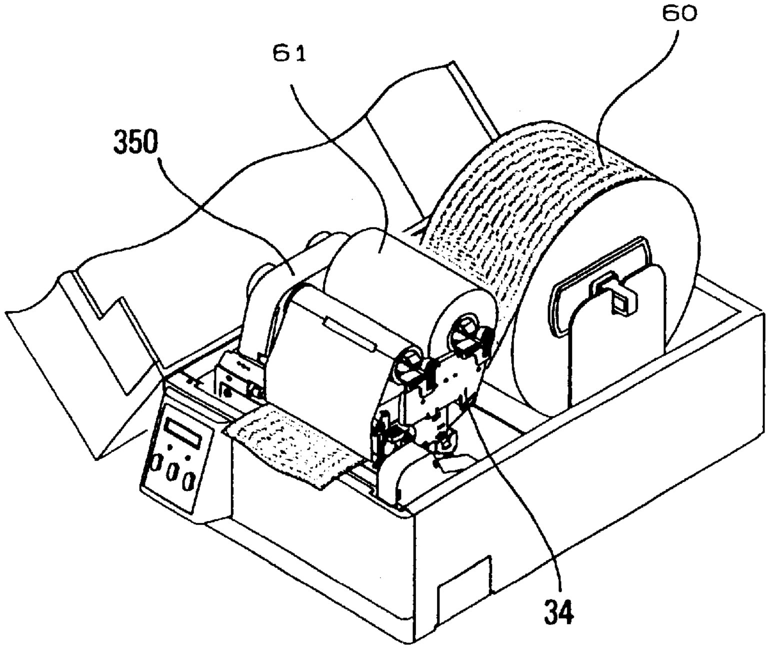
FIG. 2 is a perspective view of the printer when paper is set.

Referring to FIGS. 1 and 2, a print mechanism 30 and a paper holder 40 are mounted in a housing 10. There is provided an operation panel 50 on the front side of the housing 10, having an LCD panel, a paper feed key, a stop key and a cancel key.

A cover 20 is attached on a side of the housing 10 by hinges.

As shown in FIG. 2, a rolled paper 60 and an inked ribbon 61 are attached to the printer for printing characters.

Figure 3:
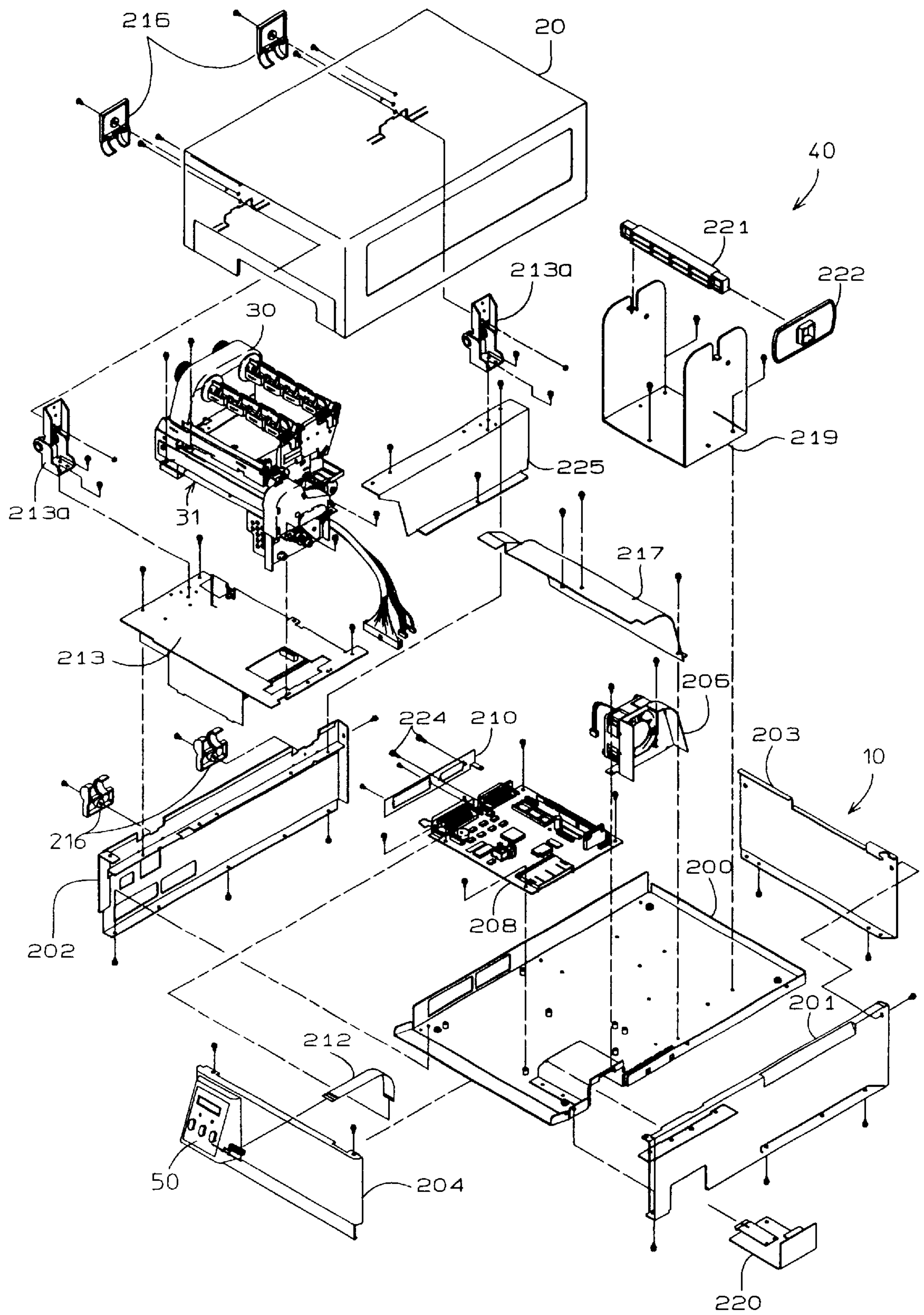
FIG. 3 is an exploded perspective view of the thermal printer.

Referring to FIG. 3 showing an exploded perspective view of the thermal printer, a front panel 204, side plates 201, 202 and a rear plate 203 are attached to a bottom plate 200 to form the housing 10.

On the bottom plate 200, a substrate 208, fan motor 206, paper holder 219 and middle plate 225 are securely mounted by screws. The operation panel 50 is connected to the substrate 208 by a cable 212. A blind plate 210 is secured to the substrate 208 by a screw and 224. Above the substrate 208, an electric source unit 213 is attached to the side plates 201, 202 by screws 214.

The printer mechanism 30 is mounted on the electric source unit 213 by screws. A cover 217 is secured to the electric source unit 213 by screws to cover the unit and substrate 208.

Each hinge 213*a* is attached to the unit 213 and the middle plate 225 by screws at one of the ends, and the other end is secured to the upper cover 20 by screws. Hinge covers, 216 are attached by screws 217.

A roll holder 221 for holding a rolled paper, and a side guide 222 are mounted in the paper holder 219. An IC cover 220 for inserting an IC card is provided on the side plate 201.

Figure 4:
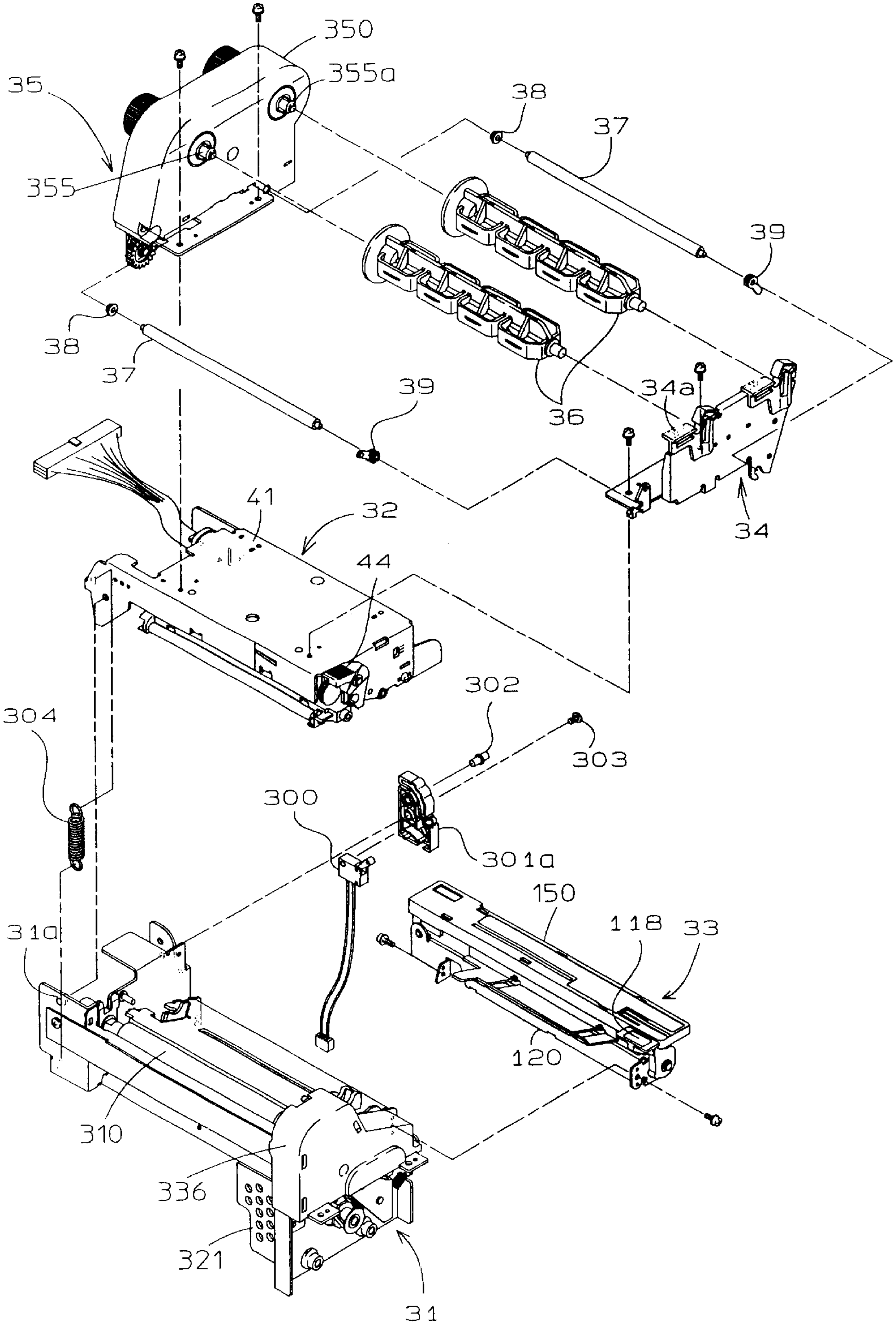
FIG. 4 is an exploded perspective view of the printer mechanism.

Referring to FIG. 4 showing an exploded perspective view of the printer mechanism, the printer mechanism 30 (FIG. 3) has a chassis assembly 31. On the chassis assembly 31, a head frame assembly 32 is rotatably mounted at a side of the chassis assembly by shafts 31*a* and 302 which are disposed in the paper feeding direction. A head open spring 304 is provided between the chassis assembly 31 and the head frame assembly 32 to urge the head frame assembly in the opening direction.

A head open detecting sensor 300 is attached to a sensor holder 301*a* which is attached to the chassis assembly 31 by a screw 303, and a paper detecting sensor 33 is attached to the assembly 31.

On the head frame assembly 32, a transfer mechanism is mounted. In the transfer mechanism, a ribbon winding unit 35 and a transfer holder 34 are mounted on the head frame assembly 32. A pair of ribbon guide shafts 37 are supported by bearings 38, 39. A pair of ribbon holders 36 for holding the ribbon are engaged with ribbon winding shafts 355 and 355*a* of the ribbon winding unit 35, at an end, and the other end of each ribbon holder 36 is roratably mounted in a bearing of the holder 34.

Figure 5:
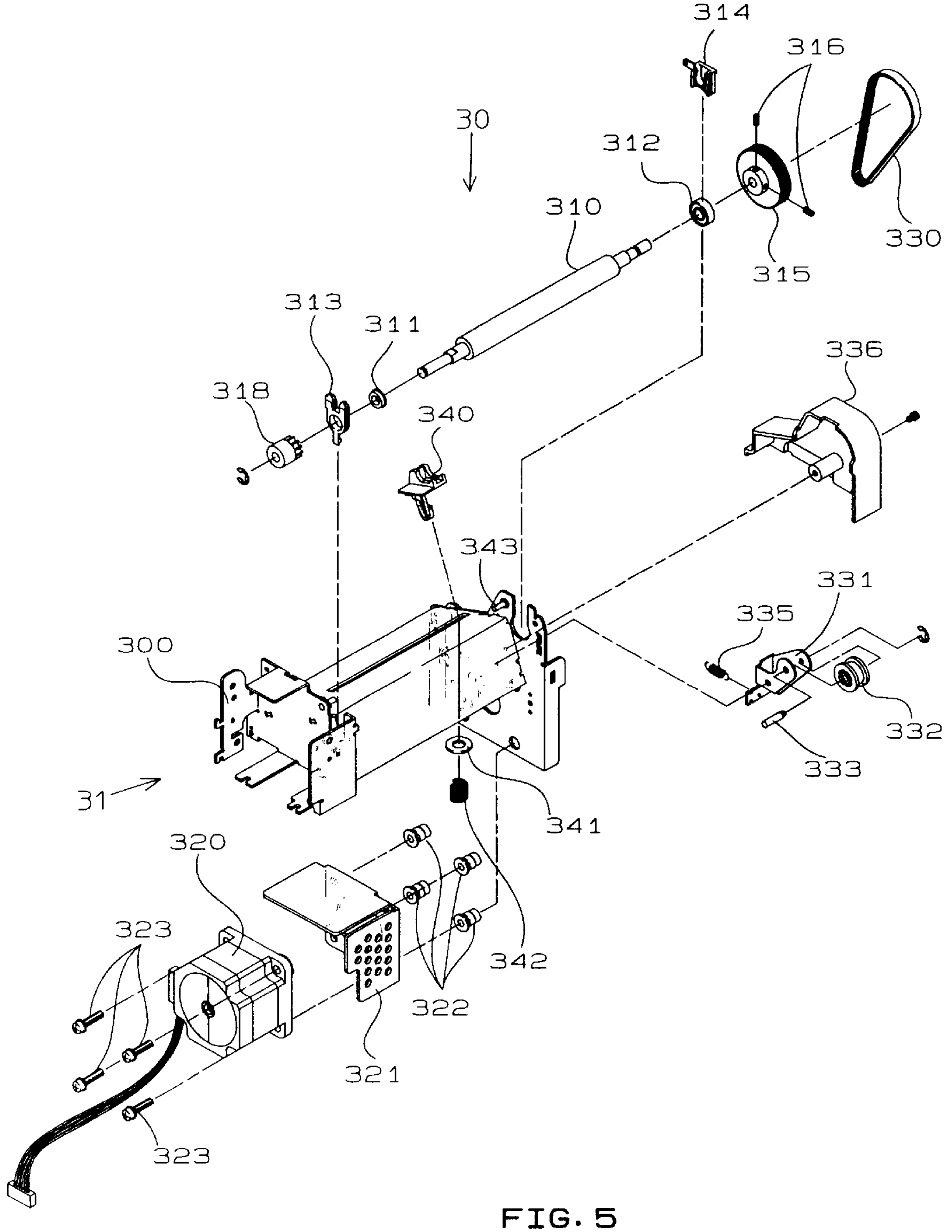
FIG. 5 is an exploded perspective view of a roller driving device of the print mechanism.

Referring to FIG. 5 showing a roller driving device of the print mechanism 30, a motor 320 is mounted on a chassis 301 of the chassis assembly 31 through a radiator plate 321 by blind nuts 322 and screws 323. A platen 310 is rotatably mounted on the chassis 301 by bearing holders 313 and 314 through ball bearings 311 and 312. A driving gear 318 having a one-way clutch is securely mounted on an end of the platen 310 by an E-ring, and a platen gear 315 is secured to the other end of the platen by Hexagon Socket Set screws 316 and covered by a cover 336.

The power of the motor 320 is transmitted to the platen gear 315 through a belt 330. There is provided a tension pulley 332 mounted on a shaft 333 fixed to a tension frame 331 by an E-ring. The tension pulley 332 is pressed against the belt 330 by a spring 335 provided between the tension frame 331 and the chassis 301 to tense the belt 330.

A paper guide 340 is slidably mounted on the chassis to be moved in the width direction of the paper. The paper guide 340 has an L-shaped guide portion and a spring 342. The paper guide 340 attached to the chassis 301 by the spring 342 is engaged with a hook, interposing a washer 341. A pin 343 is secured to the chassis 301 to which a lever of a thermal head holder is engaged as described hereinafter.

Figure 6:
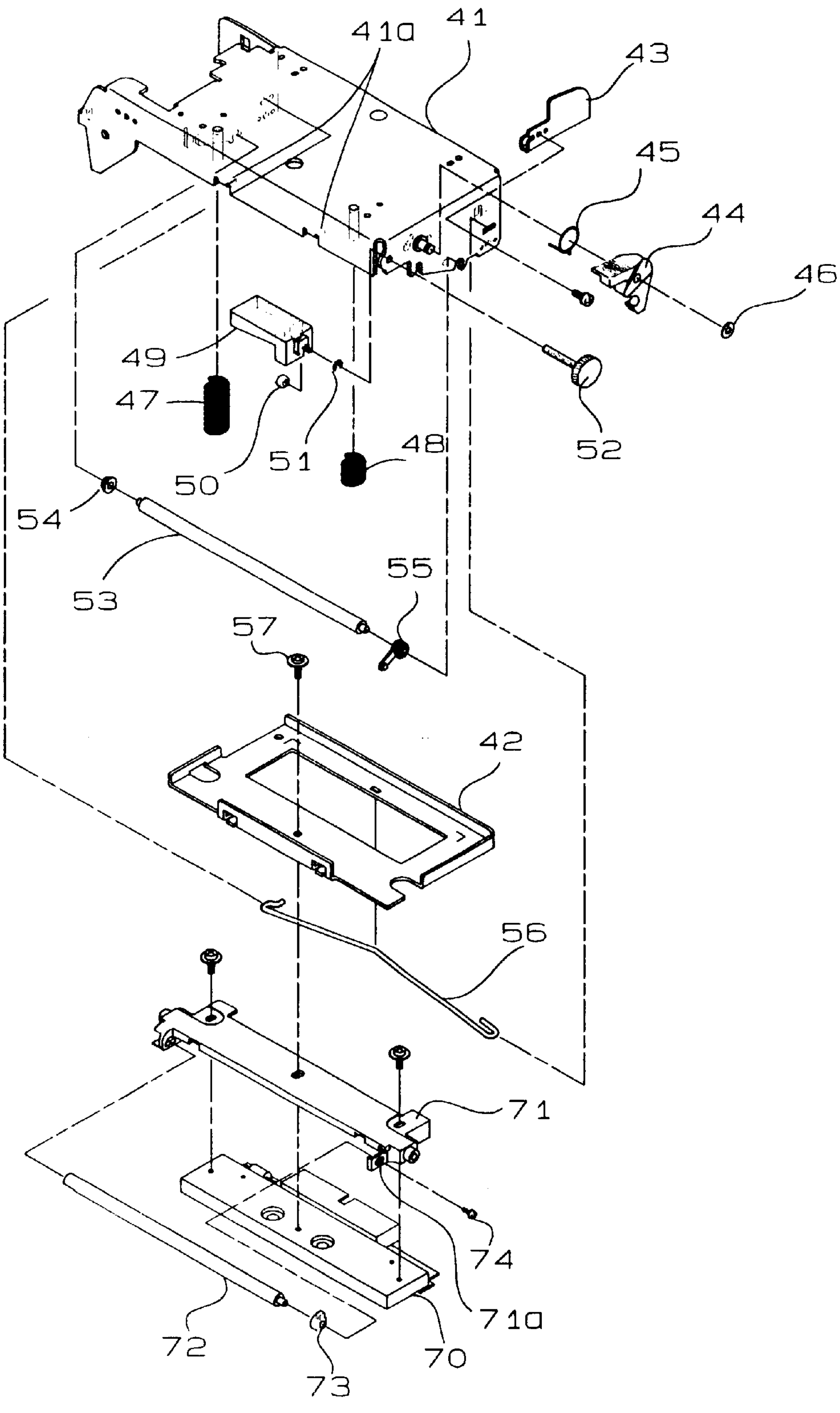
FIG. 6 is an exploded perspective view of the thermal head holder.

Referring to FIG. 6 showing the thermal head holder of the head frame assembly 32, a thermal head 70 is attached to a plate 71 by screws. A ribbon peeling shaft 72 is attached to the plate 71 74 inserted in an hole 71*a* at a right end of the shaft 72, interposing an eccentric bearing 73.

Between a head frame 41 and taper spring a pressure plate 42, springs 47 and 48 are provided so as to press the thermal head 70 against the platen 310. The taper spring 48 is disposed between the head frame 41 and a taper plate 49. In the taper plate 49, a nut 50 is inserted, a knob screw 52 is engaged with the nut from the outside of the head frame 41. The knob screw 52 is attached to the head frame 41 by an E-ring 51. Thus, the taper plate 49 is moved in the paper width direction by rotating the knob screw 52. By moving the taper plate 49, the deformation quantity of the taper spring 48 is changed, thereby changing the head pressure.

The pressure plate 42 is hung on hooks 41*a* of the head frame 41 at the front edge thereof. The rear portion of the pressure plate 42 is pressed by a torsion spring 56 attached to the head frame 41.

A ribbon guide roller 53 is provided on the head frame 41 by bearings 54 and 55. A head open lever 44 is attached to the head frame 41 by an E-ring 46. The head open lever 44 is urged by a spring 45 in an open lever rotating direction.

A paper sensor closing plate 43 is secured to the head frame 41 by a screw, and the thermal head 70 is secured by a screw 57.

Figure 7:
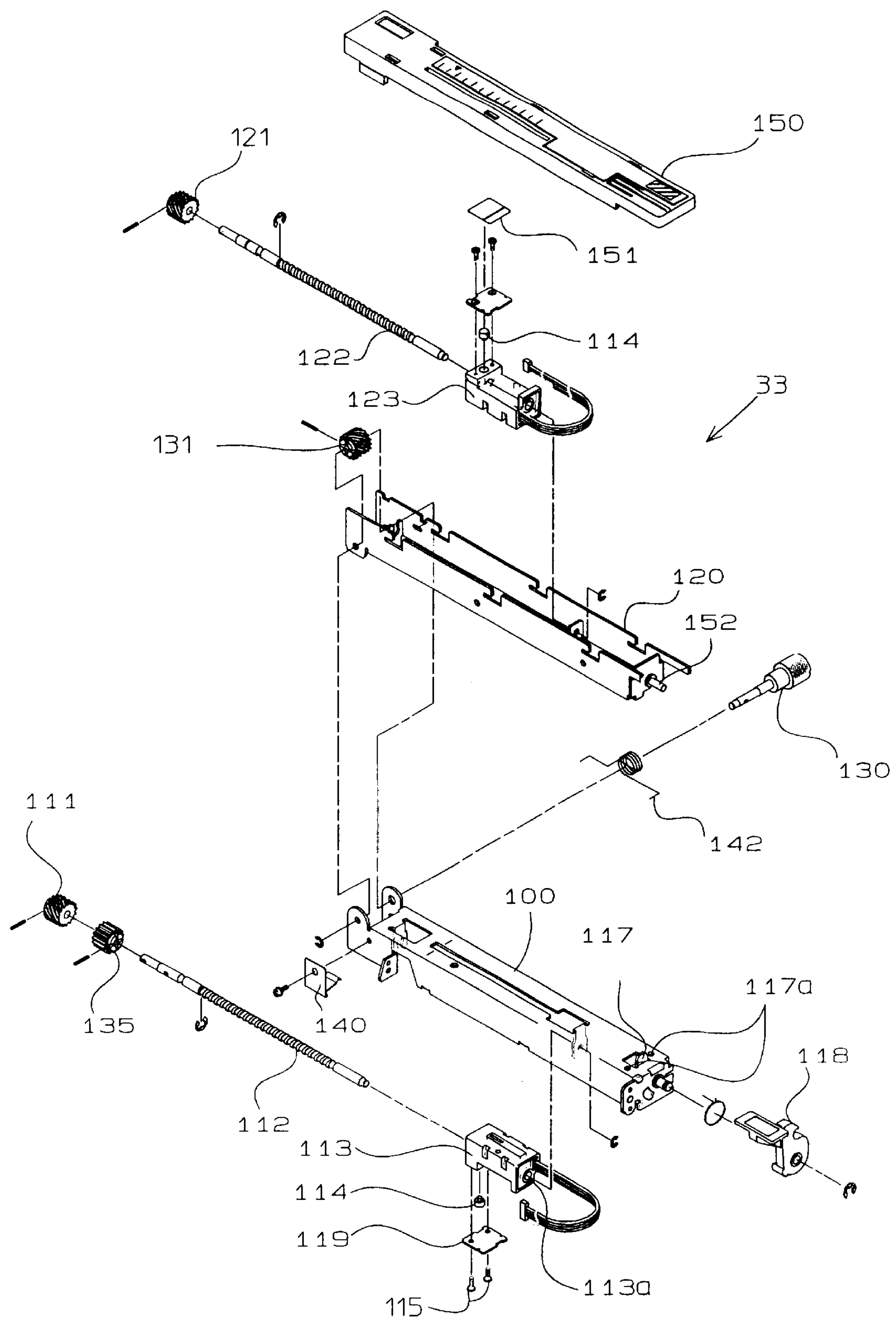
FIG. 7 is an exploded perspective view of a paper detecting sensor.

Referring to FIG. 7 showing the paper detecting sensor 33, upper and lower sensor frames 120 and 100 are pivotally supported by a knobbed shaft 130 disposed in the paper feeding direction. On the knobbed shaft 130, a screw gear 131 is attached by a spring pin.

On the sensor frame 100, supported is a spiral shaft 112 on an end of which a screw gear 111 is secured by a spring pin to be meshed with the screw gear 131 at a position perpendicular to the axis of the gear 131.

A lower sensor holder 113 is slidably mounted on the spiral shaft 112 at a pair of holes 113*a*. A pin 114 is secured to the sensor holder 113 by a cover 119 and screws 115. A tip end of the pin 114 engages with a groove of screw formed on the spiral shaft 112. Consequently, when the spiral shaft 112 is rotated, the lower sensor holder 113 is moved along the spiral shaft.

An opening is formed on the upper plate of the lower sensor holder 113, and a substrate (not shown) on which two sensors are mounted is secured to the periphery of the opening. The sensors comprise a transmitting type photo sensor and a reflection type photo sensor, which are provided for detecting the position of the paper.

The upper sensor is similarly composed to the lower sensor. Namely, there is provided on the upper sensor frame 120, a upper spiral shaft 122, screw gear 121, upper sensor holder 123, pin 114*a*. The screw of the spiral shaft 122 has the same pitch as that of the spiral shaft 112 and the spiral direction is reverse to that of the spiral shaft 112. On the upper sensor holder 123, a transmitting type photo sensor and a reflection type photo sensor are mounted so as to be opposed to those on the lower sensor holder 113.

The sensor frame 100 has a projection 117 for positioning the upper sensor frame 120 and open lever 118 which fixes the lower sensor frame 120. When the lower sensor frame 120 is closed, and the lever 118 is engaged with a pin 152, the projection 117 is engaged with a hole of the upper sensor frame 120. Thus, the upper sensor frame 120 is positioned with respect to the paper feeding direction. A pair of projections 117*a* position the upper sensor frame 120 with respect to the vertical direction.

By rotating the knobbed shaft 130, the screw gear 131 is rotated so that the screw gears 111 and 121 are rotated, thereby moving the sensor holders 113 and 123. Thus, the positions of the sensors can be changed.

A coil spring 142 is mounted on the knobbed shaft 130, and both ends of the coil spring are engaged with sensor frames 100 and 120. When the lever 118 is pushed, the sensor frame 120 is opened about the knobbed shaft 130 by the coil spring 142 as shown in FIG. 1.

Each of the sensor frames are opened, the screw gear 131 engages with the screw gears 111 and 121. Consequently, when the knobbed shaft 130 is rotated, the sensor holders 113 and 123 are moved in the paper width direction.

When the sensor frames 100 and 120 are rotated, the screw gears 111 and 121 are also rotated. For example, in the case when sensor frames 100 and 120 are opened, the screw gear 121 is rotated, and when closing, the screw gear 111 is rotated, the sensor is deflected from the set position. The deflection of the sensor causes an erroneous operation.

In the thermal printer, there is provided with an error prevention device. The device comprises a spur gear 135 secured on the spiral shaft 112 by a spring pin 136, a spring plate 140 attached to the lower sensor frame 100 and engaged with the spur gear 135. The spring plate 140 applies the brake on the gear 135 so that the gear 135, and hence screw gear 111 is not rotated at the opening and closing of the sensor frames.

The screw gear 121 consequently is rotated at the opening and closing. However, the rotations of the gear 121 are opposed. Therefore, the sensor is returned to the set position.

On the sensor cover 150, a scale is provided. On the other hand, a marked seal 151 having a line for indicating the position of the upper sensor is attached to the upper sensor holder 123.

In the condition where the head frame assembly 32 and the upper sensor frame 120 are opened as shown in FIG. 1, when the head frame assembly 32 is closed, the sensor closing plate 43 secured to the head frame 41 abuts on the sensor cover 150 to close the upper sensor frame 120.

Thus, the sensor is ensurely closed without remaining.

Figure 8:
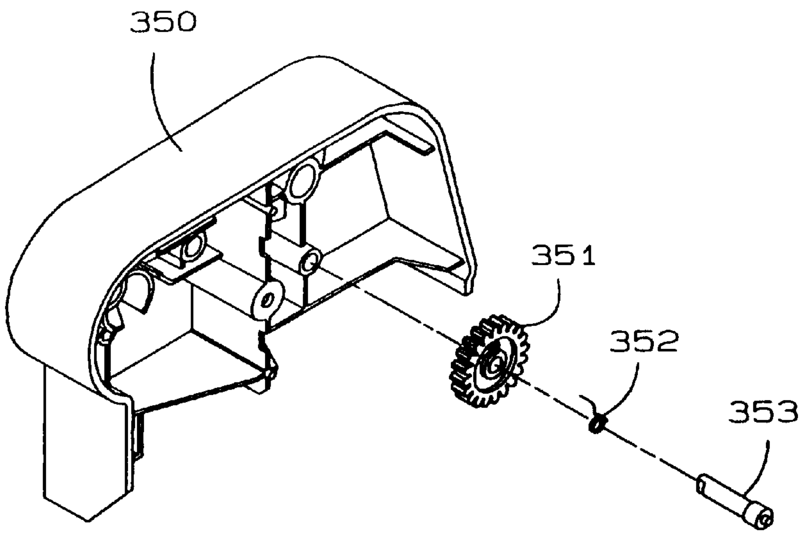
FIG. 8 is an exploded perspective view of a part of a transfer mechanism.

Referring to FIG. 8 showing a part of the transfer mechanism, a gear 351 is rotatably mounted on a cover 350 by a shaft 353. A coil spring 352 is secured to the shaft 353 at one of ends thereof and the other end of the spring is fixed to the gear 351. The coil spring 352 is adapted to apply a light load to the gear 351 at the normal direction rotation, and apply a heavy load at the reverse direction rotation.

Figure 9:
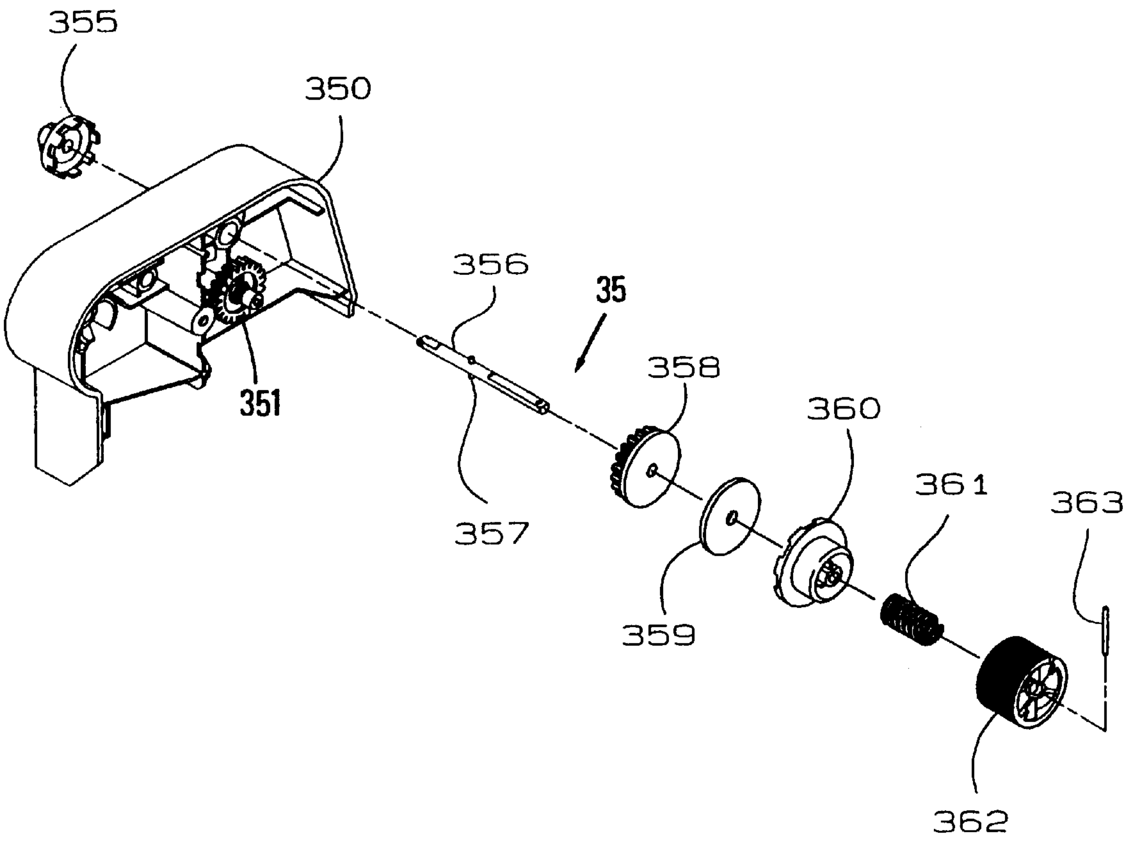
FIG. 9 is an exploded perspective view of a ribbon winding unit.

Referring to FIG. 9 showing the ribbon winding unit 35, a shaft 356 having a pin 357 is rotatably supported in the cover 350. A gear 358 engaged with the gear 351 is rotatably mounted on the shaft 356, a clutch plate 359 is rotatably mounted on the shaft 356, and a pressure plate 360 is slidably mounted on the shaft. The pressure plate 360 is pressed against the clutch plate 359 by a compression spring 361. The pressure is adjusted by an adjusting knob 362 at three steps which is selected by a pin 363.

Driving force is transmitted to the gear 351 from the driving gear 318 of the driving device of the platen 310 to rotate the gear 358. The rotation of the gear 358 is transmitted to the shaft 356 through the clutch plate 359 and the pressure plate 360, thereby rotating the ribbon winding shaft 355 secured to the shaft 356. Thus, by adjusting the pressure of the spring 361, the ribbon winding force is adjusted.

Figure 10:
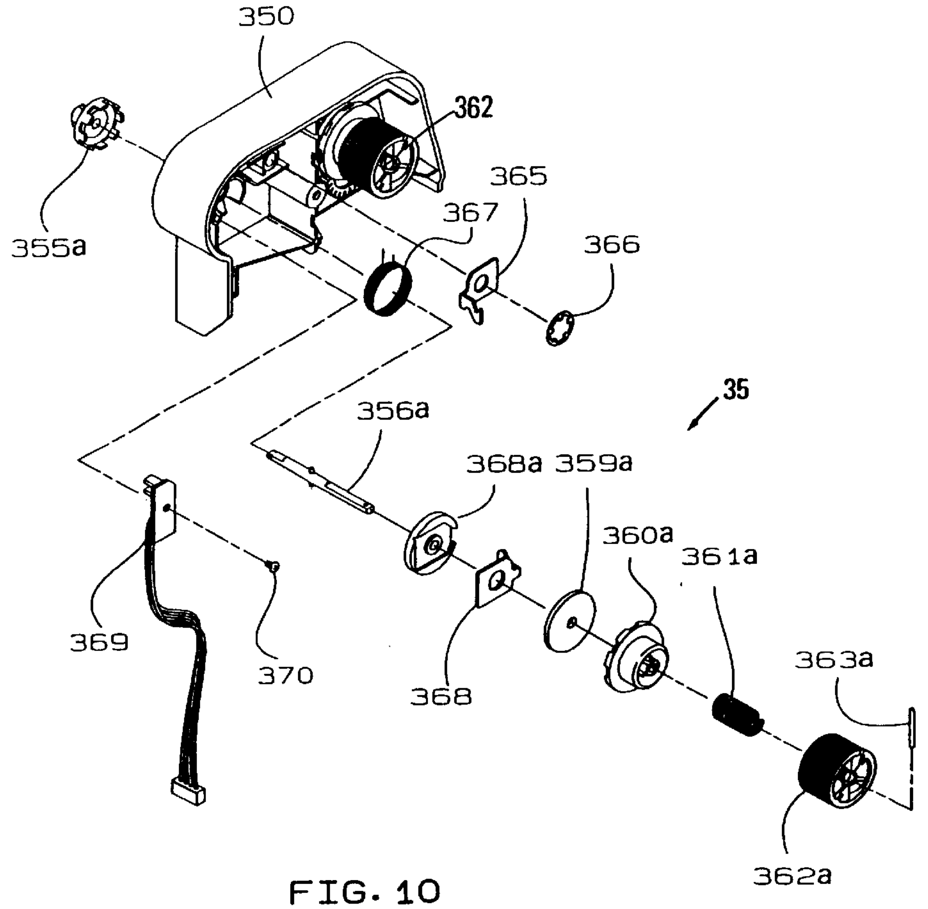
FIG. 10 is an exploded perspective view of a back tension applying device.

FIG. 10 shows a back tension applying device for applying a back tension to the ribbon on the ribbon holders 36 (FIG. 4). A spring receiving plate 365 is secured to the cover 350 by a washer 366.

A shaft 356*a* is rotatably supported in the cover 350. A hook plate 368 is securely mounted on the shaft 356*a* by an attaching plate 368*a*, a clutch plate 359*a* is rotatably mounted on the shaft 356*a*, and a pressure plate 360*a* is slidably mounted on the shaft. The pressure plate 360*a* is pressed against the clutch plate 359*a* by a compression spring 361*a*. The pressure is adjusted by an adjusting knob 362*a* at three steps which is selected by a pin 363*a*. A rewinding spring 367 is loosely mounted on the shaft 356*a*.

A ribbon end sensor 369 is attached to the cover 350 by a screw 370. The ribbon end sensor 369 detects the end of the ribbon by detecting a slit formed in the ribbon winding shaft 355*a*.

A ribbon rewind mechanism will be described with reference to FIGS. 11*a* to 11*c*.

In the label printer, the label mounting paper is cut off at every label by an autocutter.

Before the cutting of the paper, the paper is fed to the cutting position, and the next label is returned to the printing position after the cutting of the prior label by rewinding the paper.

The ribbon contacted with the paper is fed to the cutting position and returned to the printing position together with the paper. Since the ribbon is very thin, the ribbon is liable to wrinkle at the rewinding, which causes failure in printing. The ribbon rewinding mechanism is provided for preventing the ribbon from wrinkling.

Figures 11A, 11B, 11C:
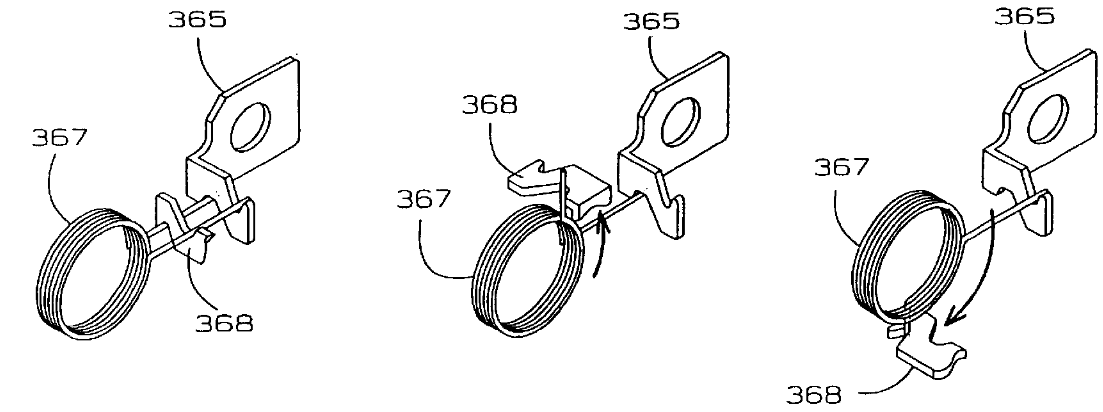
FIGS. 11*a* to 11*c* are perspective views of a ribbon rewinding mechanism.
Figure 12:
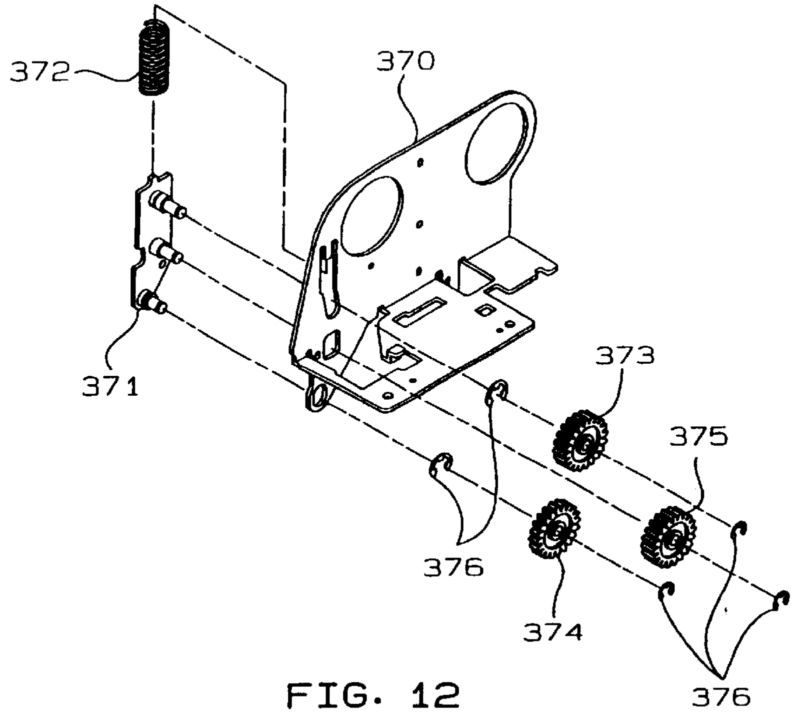
FIGS. 12 and 13 are exploded perspective views of a power transmitting device.
Figure 13:
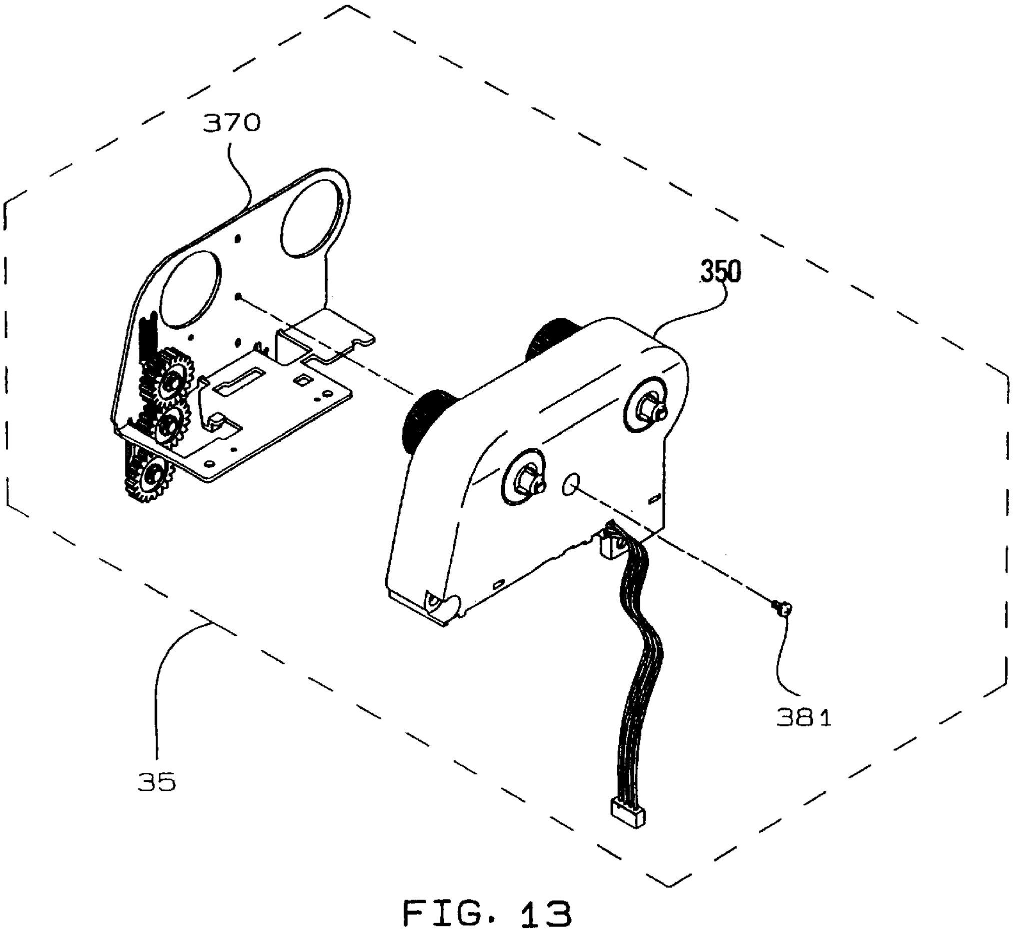

FIG. 11*a* shows a condition before the inked ribbon is set in the printer. An end portion of the rewinding spring 367 is engaged with upper portions of notches of the spring receiving plate 365 and the hook plate 368. The other end portion of the spring 367 is engaged with undersides of notches of the plates 365 and 368.

In the case of an outside winding ribbon, when printing, the shaft 356*a* is rotated by the ribbon in the direction shown by the arrow of FIG. 11*b*. Consequently, the spring 367 is wound up by the hook plate 368. When the hook plate 368 rotates about one turn, the hook plate abuts on the other end portion of the spring 367 to be stopped.

In the case of the inside winding ribbon, the spring 367 is wound up as shown in FIG. 11*c*.

When the printing finishes and the paper is rewound, the ribbon is rewound by the returning force of the spring 367. Thus, the ribbon is prevented from wrinkling.

The ribbon rewinding mechanism is necessary for the label printer in which the label is cut off at a forward position and the paper is fed back. In the ordinary printing operation, the paper is not fed back at the end of the printing. Consequently, if the head frame assembly 32 is opened after printing, the driving gear 318 (FIG. 14*a*) is disengaged from the gear 374. Accordingly, the gear 358 becomes free. If the ribbon rewinding mechanism shown in FIGS. 10–11*c* operates, only the ribbon is rewound.

In the ribbon rewound condition, if the rolled paper is exchanged, the head frame assembly 32 is closed, and the printing is started, the printing is carried out at the used inked ribbon. As a result, there may occur that the print is performed at a blank ribbon, which means characters being not printed.

The printer is provided with the rewind preventing mechanism shown in FIG. 8. More particularly, as described above, the spring 352 applies a heavy load to the gear 351 at the reverse rotation. Thus, the rewinding of the ribbon is prevented.

FIGS. 12 to 14*b* show a power transmitting device from the driving gear 318 of the platen roller.

A frame 370 is secured to the cover 350 by a screw 381. Referring to 2 FIG. 12, a suspension plate 371 is slidably mounted on the frame 370 by inserting three shafts in slits of the frame 370 and attached by E-rings 375. The suspension plate 371 is downwardly urged by a spring 372. On the three shafts, gears 373, 374 and 375 are rotatably mounted.

Figure 14A:
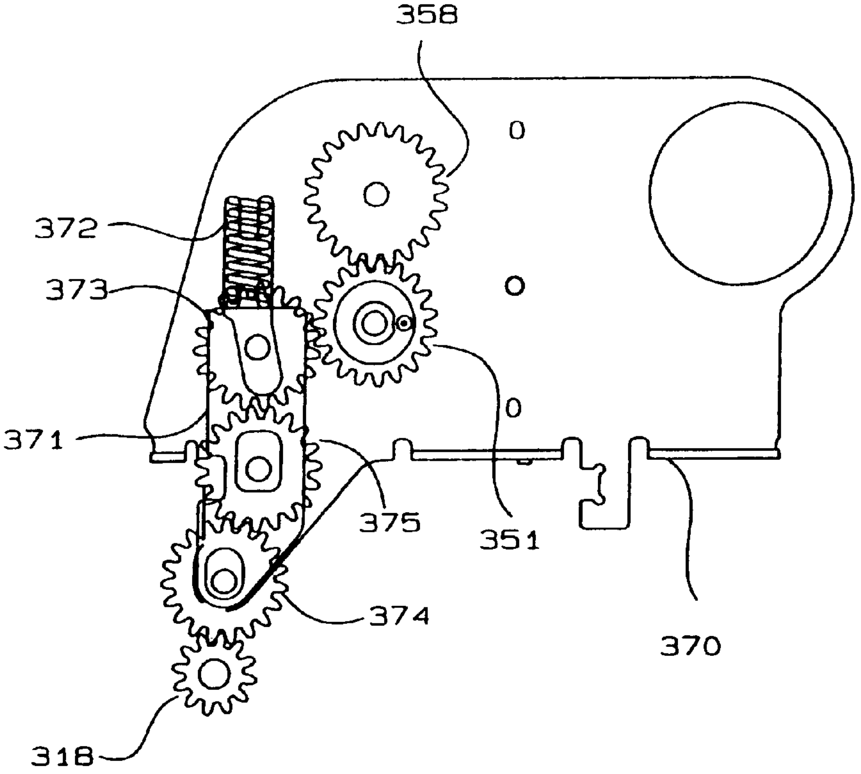
FIGS. 14*a* and 14*b* are side views of the power transmitting device.
Figure 14B:
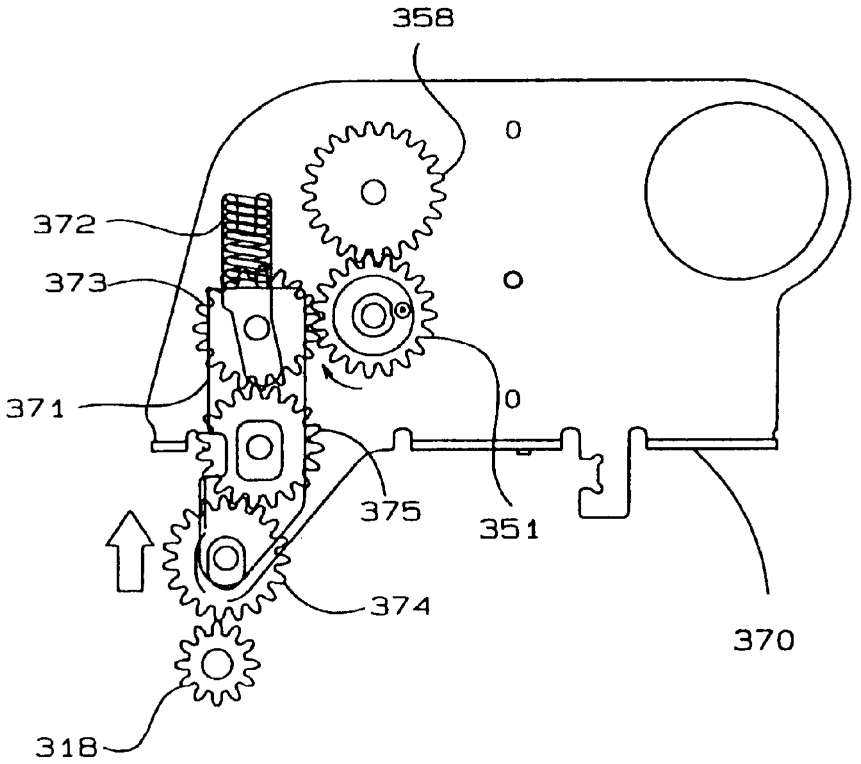

As shown in FIG. 14*a*, in the printing state, the gear 374 engages with the driving gear 318. When the head frame assembly 32 is opened and then closed, there may happen that the gear 374 does not engage with the driving gear 318 as shown in FIG. 14*b*. At that time, the suspension plate 371 is raised to compress the spring 372. Therefore, it is possible to prevent the stress from concentrating in gears.

When the driving gear 318 rotates at printing, the gear 318 engages with the gear 374.

The driving gear 318 is provided to be rotated in the driving direction by a one-way clutch. Therefore, the one-way clutch slips at the ribbon rewinding, so that the rewinding of the ribbon is effectively operated without trouble.

Referring to FIG. 4, when the head open lever 44 is pushed, a hook to the chassis assembly 31 is disengaged, the head frame assembly 32 is rotated about an axis in the paper feeding direction and hence opened by the spring 304 as shown in FIG. 1.

In order to set the paper, the open lever 118 of the paper detecting sensor 33 is pushed, a hook is detached from the sensor frame 120, so that paper detecting sensor 33 is opened by the spring 142 (FIG. 7) as shown in FIG. 1, similarly to the head frame assembly. In such a state, the paper 60 is set, and the paper detecting sensor 33 is closed, so that the inked ribbon can be set in the transfer mechanism. Under the condition where the head frame assembly 32 is opened, the inked ribbon is attached to the ribbon holder 36, and the ribbon holder is engaged with the ribbon winding shafts 355 and 355*a* and holder 34. A paper cylinder on which the ribbon is wound is similarly attached to the holder. Since the head frame assembly 32 is opened as shown in FIG. 1, the ribbon can easily be attached.

When the head frame assembly is closed, the paper is gripped by the paper detecting sensor 33. Consequently, the paper does not deflect. Thus, the head frame assembly can easily be closed by simply passing a knob 34*a*.

While the invention has been described in conjunction with preferred specific embodiment thereof, it will be understood that this description is intended to illustrate and not limit the scope of the invention, which is defined by the following claims.

What is claimed is:

1. A paper detecting sensor for a printer comprising:

upper and lower sensor frames pivotally connected to each other by a knobbed shaft;

spiral shafts disposed in a paper width direction and rotatably mounted on the upper and lower sensor frames, respectively;

a sensor holder having a sensor and slidably engaged with each of the spiral shafts;

a first screw gear securely mounted on the knobbed shaft;

second and third screw gears each of which is secured to each of the spiral shafts and engaged with the first screw gear;

whereby when the knobbed shaft is rotated each of the sensor holders is moved in the paper width direction.

2. The paper detecting sensor according to claim 1 further comprising load applying means for applying a load one of the spiral shafts so as not to be rotated when the upper frame sensor is opened.

3. The paper detecting sensor according to claim 1 further comprising a coil spring mounted on the knobbed shaft so as to upwardly urge the upper sensor frame.

* * * * *